Jan. 23, 1934.    G. L. HAMMON    1,944,428
VALVE
Filed Dec. 7, 1929
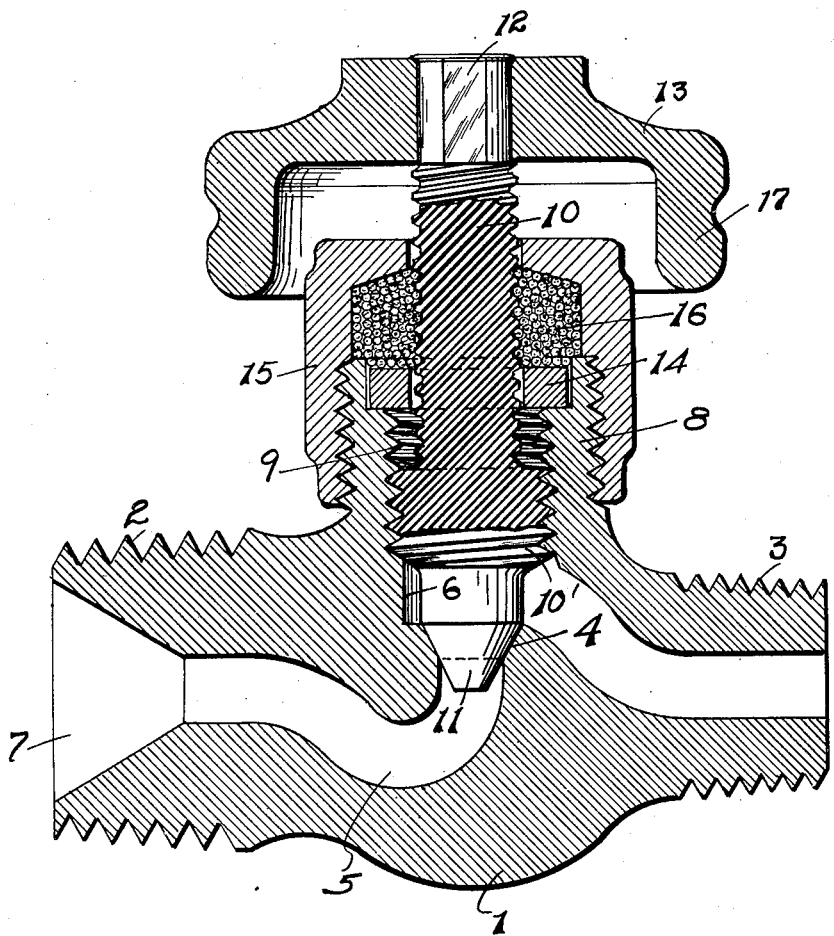
INVENTOR.
George L. Hammon.
BY
ATTORNEY Patented Jan. 23, 1934

1,944,428

UNITED STATES PATENT OFFICE 1,944,428

VALVE

George L. Hammon, San Francisco, Calif., assignor to National Welding Equipment Company, San Francisco, Calif., a corporation of California Application December 7, 1929. Serial No. 412,554

1 Claim. (Cl. 251—50)

This invention relates to improvements in valves, and more particularly to needle valves.

The principal object of the invention is to remove the lost motion in adjusting the needle valve with respect to the valve seat, to enable a finer and more accurate adjustment to be made.

Another object is to provide a simple means for accomplishing the above object so combined and arranged that it is protected against injury and tampering. Other objects and advantages will appear as the description progresses.

In this specification and the accompanying drawing, the invention is disclosed in its preferred form, but it is to be understood that it is not limited to this form, because it may be embodied in other forms. It is also to be understood that in and by the claim following the description, it is desired to cover the invention in whatsoever form it may be embodied.

In the one sheet of drawings a vertical section is shown of a needle valve constructed in accordance with this invention.

In detail the construction shown comprises the body 1 of the valve, having the threaded inlet and outlet ends 2 and 3 respectively. The tapered seat 4 is interposed in the passage 5 extending through the body 1. In valves of larger sizes this passage can be cored in the body as shown. In the smaller sizes it can be drilled from the opposite ends 2, 3, to meet a transverse bore 6 in the bottom of which the seat 4 is formed.

One or both ends of the passage may be tapered as at 7 to receive a conventional taper union, the coupling nut of which engages the externally threaded end, as at 2.

The transverse neck 8 is internally threaded, as at 9 in the upper portion of the bore 6. The valve stem 10, has the externally threaded enlargement 10' engaging the threads 9, and terminates in the tapered or "needle" valve 11, engaging the seat 4.

The upper end of the valve stem is flattened as at 12 to engage a similarly shaped hole broached in the knurled handle 13 for turning the valve stem to seat and unseat the valve 11 in the seat 4.

The upper opening of the bore 6 is enlarged to provide a seat for the annular packing ring 14, surrounding the stem 10.

The polygonal packing cap 15, encircles the stem 10 and is internally threaded to engage the neck 8.

The stem 10 is externally threaded with a fine thread of the same pitch as the thread 9. The packing 16 fits tightly around the stem 10 within the packing cap 15 and the packing ring 14. The inner top of the packing cap is slightly tapered to compress the packing 16 against the ring 14 and about the stem 10 when the cap 15 is screwed down on the neck 8.

The packing 16 performs its usual function of packing the stem 10 against leakage from the passage 5. In addition to this it firmly engages the threads on the stem 10 above the enlargement 10'. These latter threads being of the same pitch as the threads on the enlargement 10', act as a frictional brake and as a longitudinal cushion or resistance, which takes up the usual lost motion in the threads on the enlargement 10' in their engagement with the threads 9, especially when worn by long use.

This invention is especially adapted for use in connection with the gas control valves of oxyacetylene welding torches, and the control of other gases which must be micrometrically regulated.

Needle valves built in accordance with this invention can be regulated to the minimum opening because the frictional resistance of the packing 16 renders them less sensitive. A further advantage is they will for the same reason maintain any set adjustment under shock, jar or vibration, that would alter a valve not similarly constructed.

It is advantageous to assemble the ring 14 and packing cap 15 on the stem 10, then force the handle 13 thereon, and rivet the same if necessary, to prevent unskilled tampering with the packing 16, or injury to the fine threads on the stem 10. The overhanging flange 17 acts as a further protection to the stem 10.

Before the stem is screwed into the neck 8, the packing is placed around the stem between the ring 14 and the packing cap 15 to about fill the space therein.

Having thus described this invention what is claimed and desired to secure by Letters Patent is:

A valve having a body; a neck extending upward from said body; a ring seated in the top of said neck; an adjustable packing cap threaded on said neck and internally tapered at its upper end; a yielding packing in said cap interposed between the internally tapered end thereof and said ring; a valve stem having threads engaging said packing and an enlarged threaded portion engaging said body, the end of said stem engaging a seat in said body smaller in diameter than said enlarged threaded portion; a handle riveted to the upper end of said stem; and an integral flange depending from said handle and overhanging said cap.

GEORGE L. HAMMON.